United States Patent Office 2,966,415
Patented Dec. 27, 1960

2,966,415

PROCESS FOR BLEACHING CASINGS

Cleo A. Rinehart and Lloyd B. Jensen, Chicago, Ill., assignors to Swift & Company, Chicago, Ill., a corporation of Illinois No Drawing. Filed Mar. 10, 1958, Ser. No. 720,017

3 Claims. (Cl. 99—175)

This invention relates to an improved method of bleaching animal casings.

This application is a continuation in part of our application Serial No. 579,774, filed April 23, 1956, now abandoned.

Untreated animal casings vary considerably in color and the packing industry has conventionally bleached in order to obtain casings of a more uniform whiteness which is acceptable to the consumer. Natural casings are prepared from the intestines of hogs, sheep and cattle and after suitable processing, are utilized in the manufacture of sausage products.

Hydrogen peroxide has been used quite extensively for bleaching nonpigmented animal materials such as tripe, but has not been widely adapted to the bleaching of casings for the reason that gas bubbles frequently become entrapped in the casing, leaving it opaque. This is a distinct disadvantage as the casing should be clear and transparent to permit viewing of the meat stuffed therein. In addition, hydrogen peroxide is not an effective bleaching agent in the treatment of casings, producing casing which are off-white in color.

In recent years vinegar and hydrogen peroxide have been used in the processing of honeycomb tripe to improve the appearance and texture. This process, though very effective for the bleaching and improvement of the texture of tripe, has proven unsatisfactory when adapted to the processing of casings, primarily for the reason that it weakens the tissues leaving the casing unsuitable for stuffing.

We have found that good results may be had in the bleaching of casings by immersing the casing for a period of time in a dilute aqueous solution of peracetic acid. The casings are held in contact with the aqueous peracetic acid bath for several hours, the length of time depending upon the source and the condition of the casings and then subsequently washed with water to remove substantially all the peracetic acid. Generally, immersion for a period of from one to twenty-four hours in the aqueous peracetic acid bath will give a satisfactory bleach.

Either clean natural casings which have been freshly prepared and washed with water or those which have been stored in salt may be treated in accordance with our process. Those casings which have been stored in salt are more susceptible to the bleaching action for reasons which will be explained hereafter. It is necessary both with the freshly prepared and salted casings that the mucuous membrane be first removed from the casings before treatment with the aqueous peracetic acid.

It has been our experience that amounts of 40% solutions of peracetic acid in excess of .05% based on the weight of the water of the bath will effect a bleach. Concentrations between 0.05% and 1.0% of the 40% solution of peracetic acid based on the weight of the water may be used with the preferred concentration being within the range of 0.1% to 0.4% of the 40% peracetic acid solution. Peracetic acid used in the foregoing concentrations will give a pH in the range of about 4.25 to 3.4. Calculated in terms of a 100% peracetic acid (which is of course unstable and not commercially available), the range of .05% to 1.0% mentioned above would be 0.02% to 0.4% based on the weight of the water of the bleaching bath.

Although the peracetic acid solution alone will bleach the casings and produce a desirable white product, the texture of the bleached casing is not desirable since the acid appears to have a binding or contracting action on the surface of the casing. This astringent action results in a loss of slipperiness and when further handling of the casing is required, this is somewhat undesirable. This loss of slipperiness is believed to be the result of an astringent effect exerted by the acidity of the treating solution. In subsequent handling of the bleached casings it is a distinct advantage if the casings have a slippery texture since troubles with tangling of the casings which adhere to each other is thereby avoided.

The astringent action causing a loss of slip on the casing surface appears to be caused by the acidity of the bleaching solution. When pH of the bleaching solution is very low, in the range below about pH 3.5, the bleached casings produced do not have the most desirable slippery texture. Above pH 3.5 and particularly in the range pH 6.0–7.0 a very white product having the most desirable textural characteristics is produced. Alkaline pHs in the range above about pH 9 may be tolerated in the treating bath although care must be exercised so that the casings are not held in the alkaline solution for any appreciable time, or softening and breaking of the casing may result.

The acidity of the treating solution, and thus the slipperiness of the bleached casings, may be controlled by the addition of a weak base to the treating solution. Weak aqueous alkaline solutions of sodium hydroxide, sodium carbonate, tri-sodium phosphate, sodium metasilicate, sodium bicarbonate and other non-toxic alkaline materials may be employed for this purpose although sodium bicarbonate is preferred as the acidity controlling agent. Very small amounts of sodium bicarbonate in the range around 0.05–1% based on the weight of the water are required to increase the pH to the preferred range.

An additional aid in facilitating the bleaching action lies in the surprising observation that sodium chloride seems to hasten the bleaching action. The addition of 1–6% salt to the bleaching solution provides a significant increase in bleaching activity and while larger amounts in the range of 16–20% salt may be employed, the additional benefit obtained from the use of these larger amounts is not commensurate with increased cost. Of course those casings which have previously been salted may be bleached in treating solutions containing a minimum amount of salt.

In the preferred embodiment of this invention, small amounts of sodium bicarbonate or other suitable alkaline material may be added to the treating bath or to the wash water in which the casings are immersed following treatment in the bleaching bath. The use of a weak alkali such as sodium bicarbonate in the treating solution results in a rise in the pH of the bleaching bath and the consequent avoidance of the astringent action on the casings. The bicarbonate has no adverse effect on the bleaching action of the peracetic acid.

Peracetic acid is an effective bactericide and fungicide, more so than the acetic acid.

The following example is given as illustrative of the present invention and is not to be construed as limiting thereto.

*Example 1*

About 50 pounds of casings are immersed in a treating solution having the following composition: 200 pounds of water, 0.5 pound peracetic acid (40% solution). The casings are held in the above treating bath at room temperature of about 75° F. for a period of 1 to 24 hours with an occasional stirring. At the end of the immersion period the casings are transferred to a second bath containing water and held here for ½ hour to remove the peracetic acid. The casings are then flushed with water and graded as to size.

There will be an increase in pH of the aqueous peracetic bath over the treating period. Normally the initial pH of a bleaching bath will vary from approximately 3.4 to 4.25 depending on the concentration of peracetic acid employed in the instance where no sodium bicarbonate or other alkaline material is added to the bleaching bath. By the end of the treating period the pH of the treating bath may be expected to rise to about 6.0. The use of of bicarbonate in the treating bath affects the pH about as follows:

| Concentration Peracetic Acid | Concentration Sodium Bicarbonate | Initial pH | pH after 18 Hours Standing |
|---|---|---|---|
| 0.05 | -------- | 4.7 | 4.6 |
| 0.1 | 0.2 | 6.5 | 8.0 |
| 0.1 | 0.1 | 6.4 | 7.5 |

The following example shows the bleaching process wherein a pH controlled solution is employed:

Example II

The treating solution employed in this example is made up of 200 pounds of water, 0.2 pound peracetic acid (40% solution), 0.4 pound sodium bicarbonate, and 2–12 pounds of salt. The casings, about 50 pounds, are held in the treating bath at room temperature of about 75° F. for a period of from 1 to 24 hours with occasional stirring. At the end of the immersion period, the casings are transferred to a dip solution containing 0.05% sodium ascorbate by weight dissolved in water. After removal from the dip, the casings are flushed and graded.

As has been noted previously, it is desirable to subject the treated casings upon emergence from the treating solution to a water wash to remove all traces of residual peracetic acid. A further advantage is obtained if the wash solution contains a water soluble derivative such as a salt of an edible reducing agent. Sodium ascorbate and sodium isoascorbate are useful for this purpose. Other useful edible reducing agents such as ascorbic acid, isoascorbic acid, and water soluble salts of niacin may be employed. A concentration of as little as 0.05% sodium isoascorbate in the wash solution is satisfactory.

Obviously many modifications and variations of the invention as hereinbefore set forth may be made without departing from the spirit and scope thereof, and therefore only such limitations should be imposed as are indicated in the appended claims.

We claim:

1. In a process for bleaching casings from which the mucous membrane has been removed, the steps comprising holding the casings in a water bath containing peracetic acid in an amount between about 0.02 and 0.4% based on the weight of the water, said water bath having a pH between about 3.5 and about 9, for a period of time sufficient to obtain an adequate bleaching, whereby white transparent casings substantially free from entrapped gas bubbles are produced, and thereafter immersing the casings in a water bath to wash substantially all of the peracetic acid therefrom.

2. In a process for bleaching casings from which the mucous membrane has been removed, the steps comprising holding the casings in an aqueous bath having a small amount of peracetic acid in an amount between about 0.02 and 0.4% based on the weight of the water, said aqueous bath having a pH of between about 3.5 and about 9, for a period of time sufficient to obtain an adequate bleaching, whereby white transparent casings substantially free from entrapped gas bubbles are produced, said aqueous bath having dissolved therein between about 0.05 and about 1% of sodium bicarbonate based on the weight of the water in said aqueous bath and thereafter immersing the casings in a water bath to wash substantially all of the peracetic acid therefrom.

3. In a process for bleaching casings from which the mucous membrane has been removed, the steps comprising holding the casings in a water bath containing peracetic acid in a small amount between about 0.02 and 0.4% based on the weight of the water, said water bath having a pH of between about 3.5 and about 9, for a period of time sufficient to obtain an adequate bleaching, whereby white transparent casings substantially free from entrapped gas bubbles are produced, and thereafter immersing the casings in a water bath to rinse substantially all of the peracetic acid therefrom, said wash bath having dissolved therein between about 0.05 and about 1% of sodium bicarbonate based on the weight of the water.

References Cited in the file of this patent

UNITED STATES PATENTS

| 1,412,523 | Hochstadter | Apr. 11, 1922 |
| 2,314,313 | Rinehart | Mar. 16, 1943 |
| 2,728,759 | Keil | Dec. 27, 1955 |

OTHER REFERENCES

"The Merck Index," 6th edition, 1952, published by Merck & Co. Inc., Rahway, New Jersey, page 730, article entitled Peracetic acid.